Feb. 27, 1934.        J. M. SIMPSON ET AL        1,949,221
              FREE WHEELING TRANSMISSION
              Filed Oct. 17, 1931        5 Sheets-Sheet 2
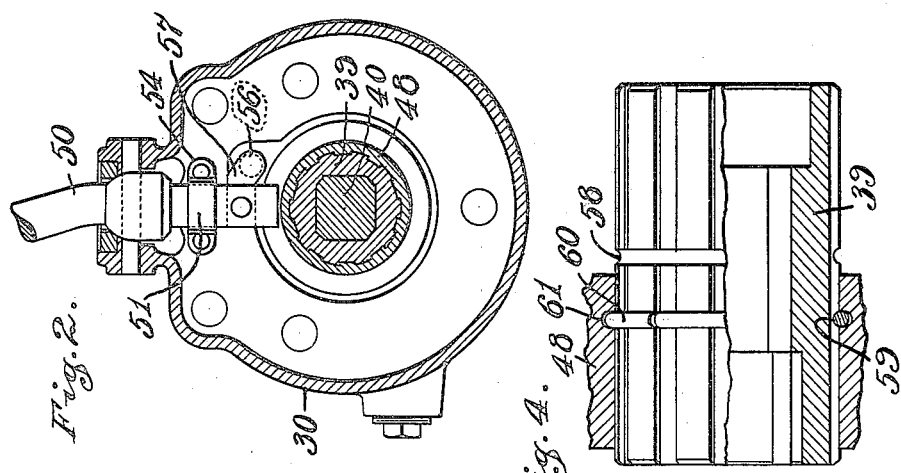
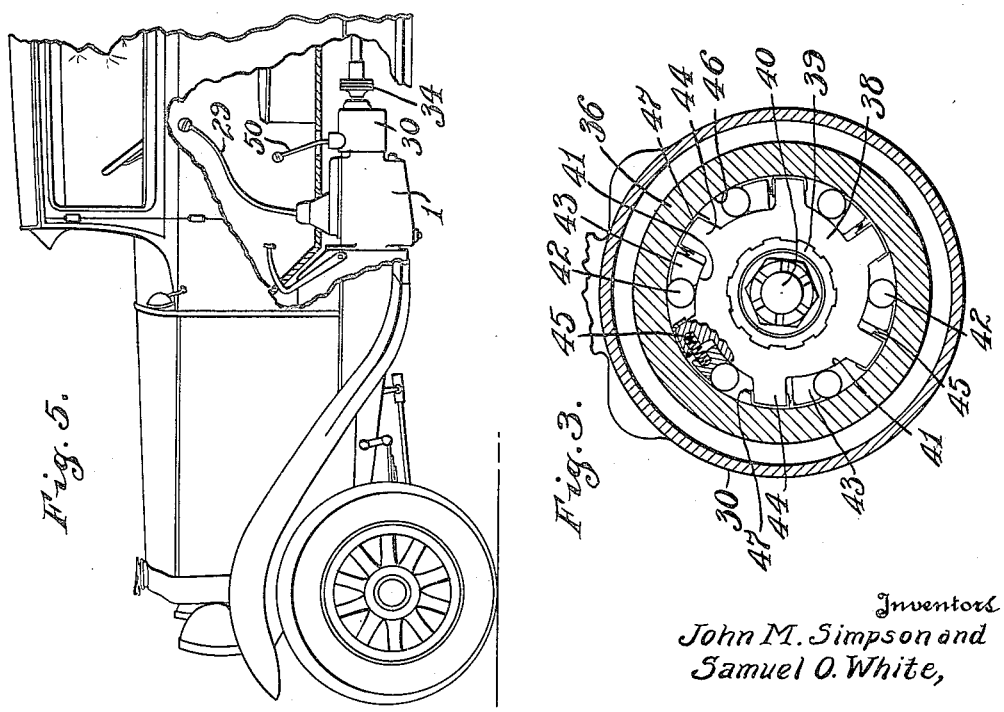
Inventors
John M. Simpson and
Samuel O. White,
By
Hood & Hahn.
Attorneys

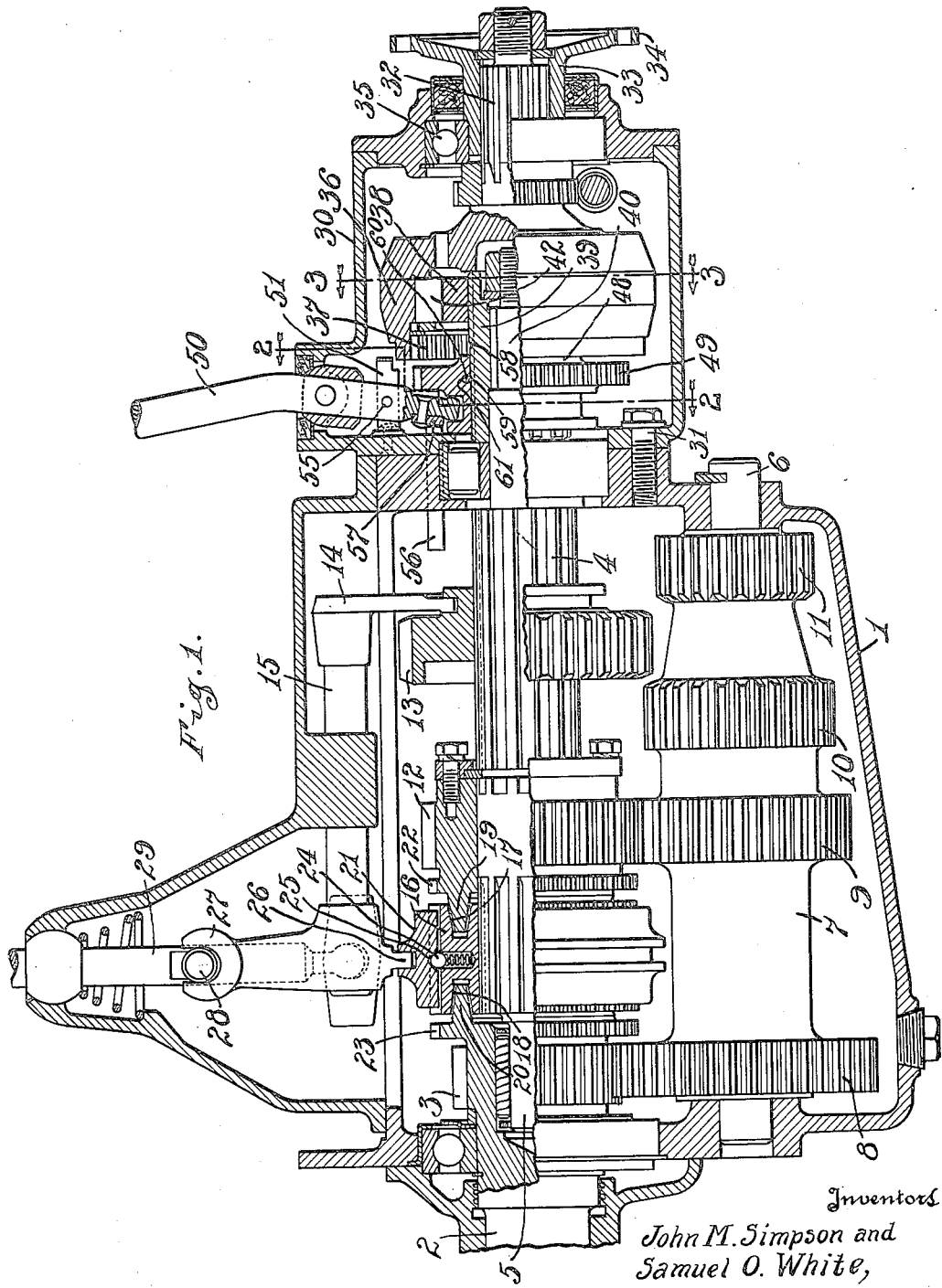

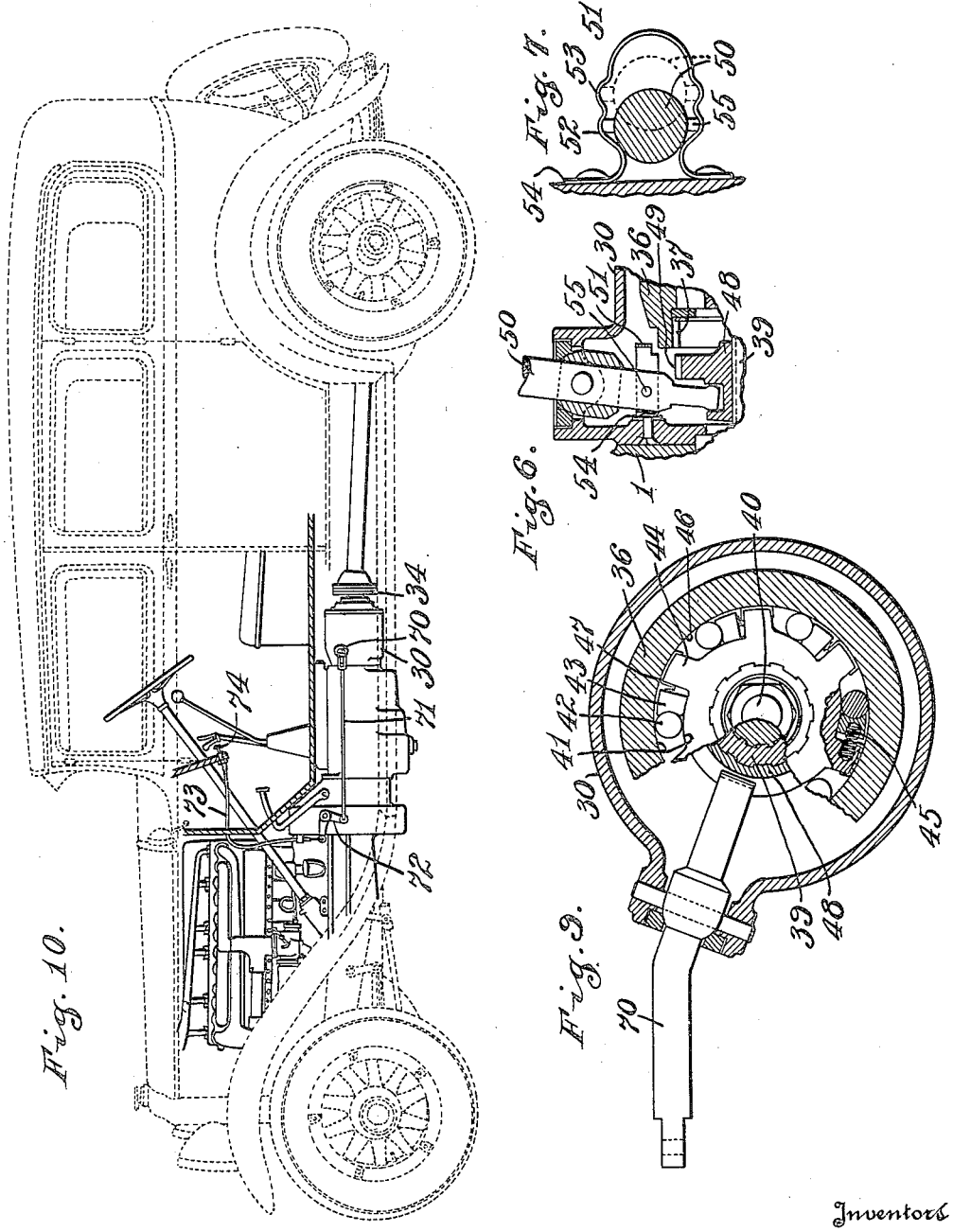

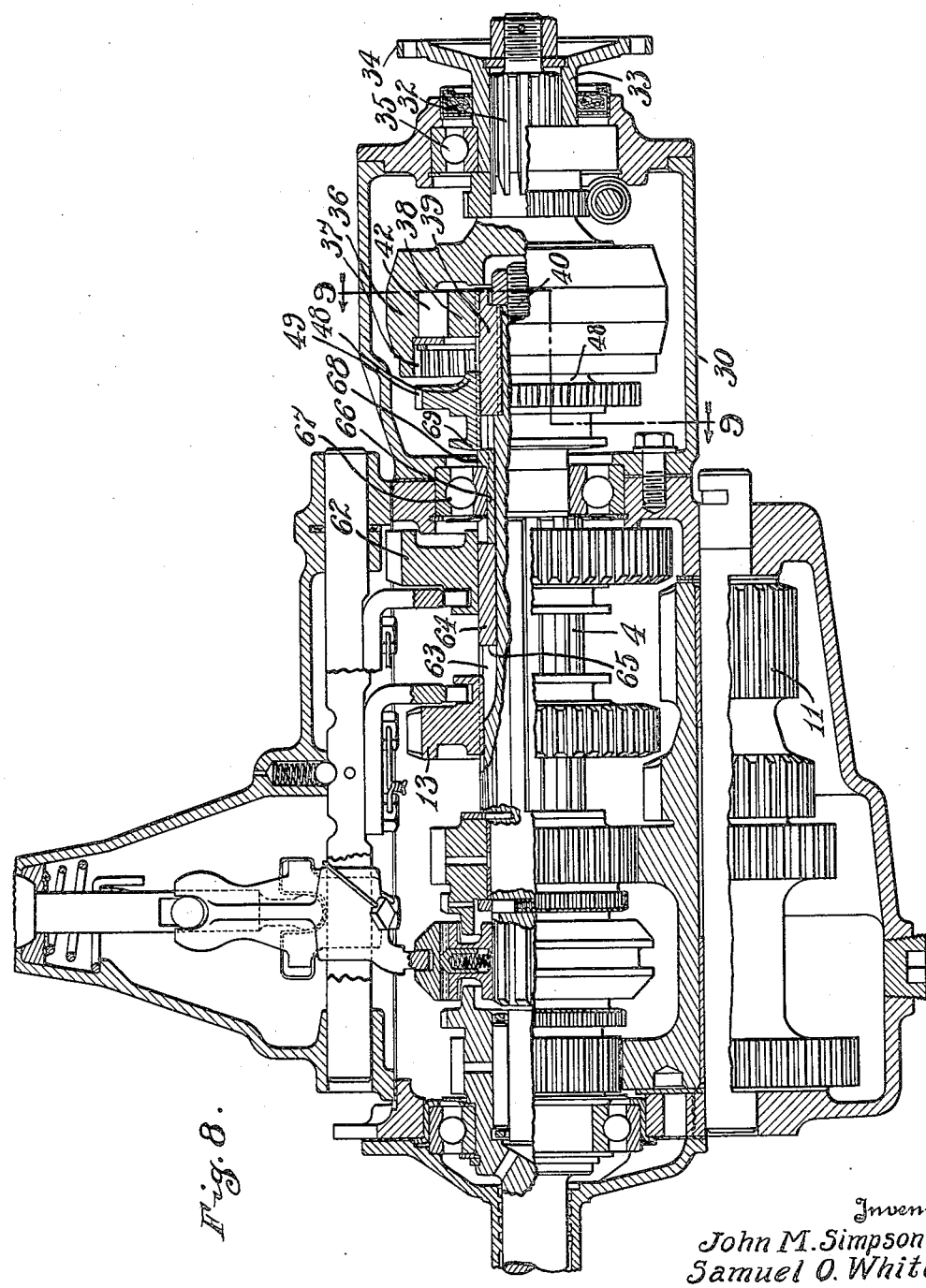

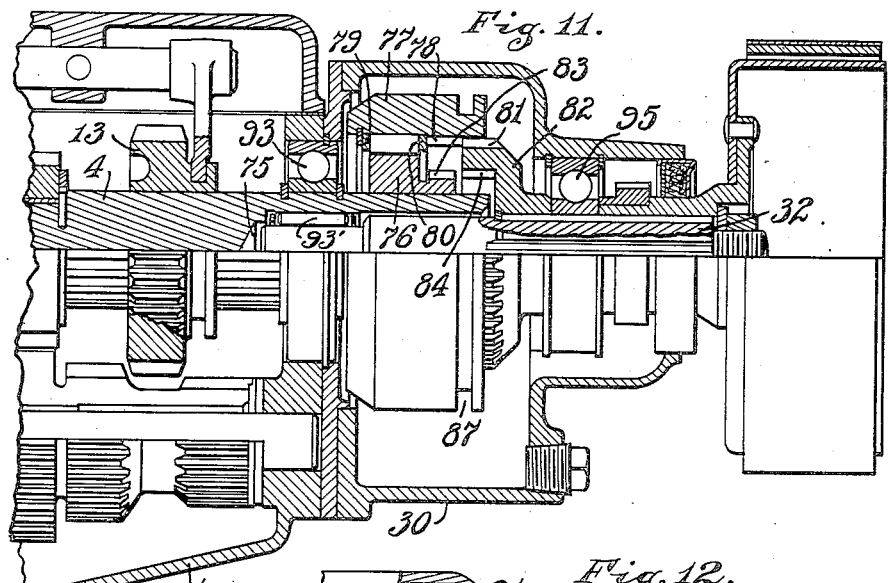
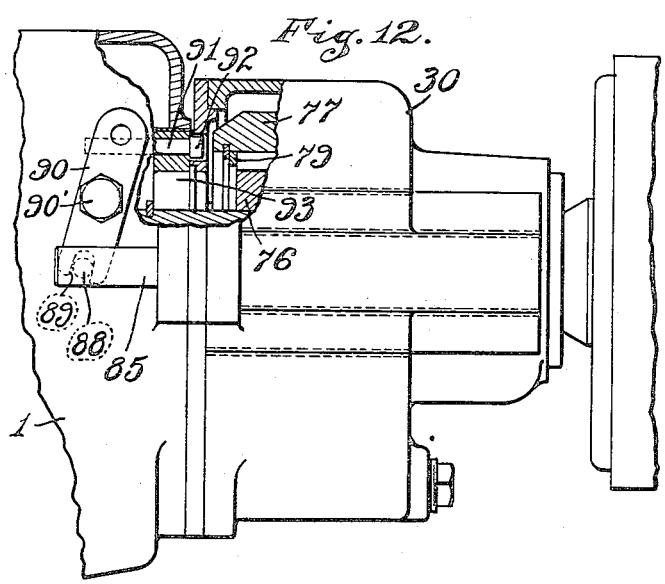
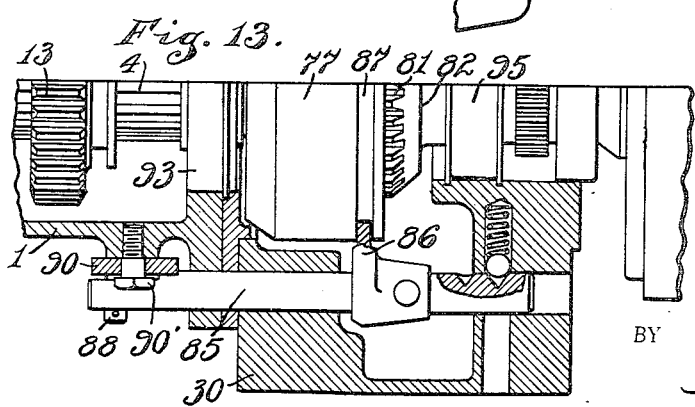

Patented Feb. 27, 1934

1,949,221

UNITED STATES PATENT OFFICE 1,949,221

FREE WHEELING TRANSMISSION

John M. Simpson and Samuel O. White, Muncie, Ind., assignors, by mesne assignments, to Free Wheeling Patents Corporation, South Bend, Ind., a corporation of Delaware Application October 17, 1931. Serial No. 569,364

3 Claims. (Cl. 74—59)

Our invention relates to improvements in transmissions for automobiles and particularly to that type of transmission which is commercially known as the "free wheeling" transmission, wherein means are provided for automatically disconnecting the propeller shaft of the automobile from the drive shaft of the engine when the momentum of the automobile operates the propeller shaft at a greater speed than that of the engine shaft.

It is one of the objects of our invention to provide a free wheeling transmission wherein the free wheel mechanism may be embodied in a separate unit casing readily attachable to the casing of the transmission proper. Another object of our invention is to provide a free wheeling mechanism which may be incorporated in the transmission without modification of the transmission or of the driven shaft of the transmission.

Another object of the invention is the provision of means whereby the free wheeling mechanism may be "locked up" and allowed to remain in its locked up position irrespective of the shifting of the transmission. Another object of the invention is the provision of means whereby, whenever the transmission is shifted into reverse speed, the free wheeling mechanism will be automatically locked up during the reverse drive. Other objects and advantages of the invention will appear more fully hereinafter in the accompanying specification and claims.

For the purpose of disclosing the invention we have illustrated certain embodiments thereof in the accompanying drawings, in which:

Fig. 1 is a longitudinal sectional view of a transmission embodying our invention;

Fig. 2 is a transverse sectional view on the line 2—2 of Fig. 1;

Fig. 3 is a transverse sectional view on the line 3—3 of Fig. 1;

Fig. 4 is a detailed section of the sleeve on which the free wheeling unit is mounted;

Fig. 5 is a side elevation, partially broken away, of an automobile showing the relative location of the parts of the transmission;

Fig. 6 is a detail of the free wheeling shift lever;

Fig. 7 is a detail of the mechanism for maintaining the shift lever in its shifted position;

Fig. 8 is a longitudinal sectional view of a transmission embodying a modified form of my invention;

Fig. 9 is a transverse sectional view on the lines 9—9 of Fig. 8;

Fig. 10 is a side elevation of an automobile showing the relative location of the parts of the embodiment of Fig. 8;

Fig. 11 is a longitudinal sectional view of a modification of the free wheeling mechanism;

Fig. 12 is a side elevation partly in section showing the manner in which the free wheeling mechanism of Fig. 11 is locked up upon going into reverse drive; and Fig. 13 is a detail section showing the shifting mechanism for the free wheeling mechanism illustrated in Fig. 11.

In the embodiment of the invention illustrated in Figs. 1 to 7, the transmission housing 1 has extending thereinto through the front end the usual drive shaft 2 which is connected to the engine through the usual clutch and is provided, at its end and within the transmission housing, with a gear 3. The driven shaft 4 extends through the opposite end of the transmission housing and has its free end 5 piloted in the free end of the driving shaft 2.

Beneath the driven shaft and driving shafts is mounted the usual jack shaft 6 having a sleeve 7 rotatably mounted thereon and provided with the gears 8, 9, 10, and 11. The gear 8 is in constant mesh with the gear 3 on the drive shaft 2. The gear 9 is in constant mesh with a gear 12 rotatably mounted on the driven shaft 4 and the gear 10 is adapted to be meshed with a gear 13 splined on the shaft and operated by a suitable fork 14 carried by a shift rod 15. This gear 13 is also adapted to mesh with an idler (not shown) in turn meshing with the gear 11 for reverse drive. Splined on the shaft 4 between the gear 12 and the gear 3 is an axially shiftable friction clutch member 16 having oppositely disposed cone clutch faces 17 and 18 adapted to cooperate respectively with the cone clutch member 19, mounted on the gear 12, and a second cone clutch member 20 mounted on the shaft 2. Splined on this clutch member 16 is a positive clutch member 21, the splined teeth of which are adapted to engage the teeth 22 on the gear 12 or the teeth 23 on the shaft 2, depending upon the direction in which the member 21 is axially shifted. The two members 21 and 16 are releasably locked together by means of spring pressed balls 24 taking into notches 25 in the shiftable member 21. The positive clutch member 21 is shifted by a fork 26 on a suitable shift rod, which fork in turn is provided with an extension 27 adapted to be engaged by a pin 28 extending laterally from the shift lever 29. When the positive clutch member 21 is shifted to the right, looking at Fig. 1, the friction clutch member 16 is first moved to cause the cone or friction clutches to engage thereby bringing the gear 12 into synchronized speed with the shaft 4, it being noted that the gear 12 is being driven through the gears 9, 8, and 3. By the time this synchronization is effected a continued movement of the positive clutch member 21 will depress the balls 24 releasing the positive clutch member and causing its teeth to mesh with the teeth 22 thereby positively connecting the gear 12 with the shaft 4. This drives the driven shaft 4 at second speed. To drive the shaft 4 at high or first speed the positive clutch member 21 is shifted to the left (looking at Fig. 1) whereby first the friction clutch and then the positive clutch will be engaged, thus connecting the shafts 2 and 4 directly.

For driving in low speed the gear 13 is shifted into engagement with the gear 10 and for driving in reverse the gear 13 is shifted to the right (looking at Fig. 1) to mesh the same with the reverse idler in turn in mesh with the gear 11.

Secured to the rear end wall of the casing 1 is a second housing or casing 30. The front wall of this second housing may, if desired, be a part of the rear wall of the casing 1, although I have found that in practice it is very advantageous to make the casing 30 a separate casing, machining the meeting faces of the two end walls of the casings 1 and 30 so that they will fit, and securing the casing 30 to the casing 1 by suitable bolts or machine screws 31. This casing 30 has extending thereinto a short shaft 32 which has splined thereon a sleeve 33 having a portion 34 to which the propeller shaft of the car may be connected. It will be seen that this sleeve 33 is centered and supported by the bearings 35 at the end wall of the casing 30 which at the same time also supports the shaft 32. The inner end of the shaft 32 carries the outer member 36 of an overrunning clutch and this member has formed on the inner periphery thereof, at its edge, positive clutch teeth 37, the purpose of which will appear more fully hereinafter. The inner member 38 of the overrunning clutch is splined on a sleeve 39 in turn splined on an extension 40 of the driven shaft 4. This inner member is provided with a series of cam surfaces 41 on its outer periphery adapted to receive rollers 42 which rollers, it will be noted, are interposed between the inner surface of the outer member 36 of the clutch and the cam surfaces 41. The rollers are biased towards the high portion of the cam by suitable shoes 43 interposed between which and shoulders 44 on the inner cam member are coiled springs 45. This arrangement and construction of the clutch is such that with the outer member rotating relatively to the inner clutch member in a clockwise direction, looking at Fig. 3, the clutch will not engage as the rollers 42 tend to move toward the lower portion of the cam 41. However, with a reversal of the operation of the parts the rollers 42, tending to ride up the cam surfaces 41, will wedge the two parts together. It will be noted that the shoulders 44 have a very slight, if any, clearance between the tops thereof and the inner surface 46 of the outer clutch member 36. This is particularly advantageous as there is a tendency of this clutch member 36 during the rotation of the parts to whip under the impulses of the propeller shaft. Due to the small amount of clearance provided, the shoulders 44 provide a support for the outer clutch member 36 on the stiffer driven shaft 4 and prevent this whipping action. In order to prevent scoring of the inner surface of the clutch member 36 we interpose between the shoulders 44 and the outer clutch member, caps 47 which may be of softer material, such for instance, as copper, bronze or the like. The caps 47 are clamped into place by a press, in assembling the parts, so that they are, in effect, permanently attached in place. It is thus seen that in effect the outer clutch member 36 is supported upon the end of the shaft 4.

A positive clutch member 48 is splined on the sleeve 39, which member is provided with teeth 49 adapted, when the clutch member is moved to the right, looking at Fig. 1, to engage the teeth 37 to thereby connect the clutch member 36 with the driven shaft 4 irrespective of the direction of operation of the two shafts 32 and 4. This positive clutch member is operated by a shift lever 50 extending upwardly from the casing 30 and pivotally mounted therein on a suitable pivot pin. In order to prevent rattling of the parts and to maintain the clutch member 48 in its shifted position, I provide a spring retaining member which may be in the form of a U shaped spring 51 having suitable enlarged portions 52 and 53. The ends 54 of this spring are secured to the wall of the casing, and the shift lever 50 is provided with a transversely extending pin 55 which may snap into the portions 52 or 53. When the lever is shifted into the non-lock up position, the pin is in the portions 52 and when it is in the lock up position the pin is in the portions 53.

It is to be noted that when the free wheeling mechanism of the transmission is in its normal or operative position the parts are in the positions illustrated in Fig. 1. If, with the parts in this position, the transmission should be shifted into reverse it is obvious that the relative rotative movement of the outer and inner members of the overrunning clutch would be such that the transmission would be ineffective or inoperative for driving the car; therefore, in order to lock up the overrunning clutch when the transmission mechanism is moved to reverse position, we provide a lock up operating rod 56 which is slidably mounted in the end walls of the two casings and projected into the path of the gear 13, the opposite end being adapted to engage an offset projection 57 secured on the end of the lever 50 whereby, when the gear 13 is shifted to the right, looking at Fig. 1, into reverse driving position, this gear will strike the rod 56 and thereby, through the rod 56, move the lock up clutch 48 into lock up engagement with the teeth 37, thereby connecting the shafts 32 and 4 for drive irrespective of the direction of rotation of the shafts. When the gear 13 is shifted out of reverse position, the free wheeling mechanism remains in locked up position, and in order to again go into free wheeling position it is necessary to shift the lever 50 to disconnect the lock up clutch.

By the above arrangement it will be seen that the operator may at any time shift into free wheeling position or to lock up position by the manipulation of the shift lever 50 and the parts will remain in the position into which they have been shifted irrespective of the shift of the transmission, except, of course, when the transmission is moved into reverse. In Fig. 5 we have shown the relative positions of the parts and it will be seen that the shift lever 50 is adapted to extend up through the floor board of the automobile in front of the driver's seat and is conveniently positioned relatively to the shift lever 29 and at a point where the driver may have ready access thereto.

In order that the lock up clutch may additionally be maintained in its shifted positions the sleeve 39 has formed therein a pair of parallel grooves 58 and 59 into which is adapted to snap a split ring 60 arranged in a groove 61 in the hub of the clutch member 48 and movable with this hub when the same is moved into disconnected or connected position.

In the structure illustrated in Fig. 8 we have shown a modification of our invention which is particularly adapted for use in connection with a four speed transmission. In this structure the gear 11 is made considerably wider and an additional gear 62 is mounted on the driven shaft 4. This gear when shifted forward is adapted to mesh with the gear 11 and thus provides a fourth speed as distinguished from the three speed transmission illustrated in Fig. 1. As the normal position of the gear 62 is to the rear or towards the right, looking at Fig. 8, it would be impractical to provide the lock up rod operated by the gear 13, when shifting to reverse for moving the clutch member 48 to lock up position. In order to avoid the use of this shifter rod 56 the shaft 4 is provided with an exceptionally deep splined groove 63 in which is arranged, an axially shiftable key 64 which is adapted to pass beneath the gear 62. The front end 65 of this key is adapted to be engaged by the gear 13, when the same is moved into reverse position, so that the key 64 will move rearwardly with the gear 13. The rear end of this key abuts a second key 66 which is comparatively thin to pass beneath the annular bearing 67 and is provided with an upwardly extending projection 68 adapted to engage the hub 69 of the lock up clutch 48 to move this into lock up position by the rearward movement of the gear 13. The two keys 66 and 64 are made separate merely for the purpose of assembly and could, if desired, be made integral.

In this structure it will be noted from Fig. 9 that the shift lever 70 for operating the lock up clutch, and corresponding to the lever 50, is taken off at the side of the casing in a substantially horizontal position instead of a vertical position as illustrated with respect to the structures shown in Figs. 1 to 5 inclusive. With this side take off we provide a different form of control mechanism. This lever 70 may be connected by a link or rod 71 with a bell crank lever 72, in turn connected by a Bowden wire 73 with a control handle 74 mounted on the dash of the automobile. By this arrangement the floor board of the car may be left clear and the control of the lock up mechanism of the overrunning clutch manipulated from the dash or front board of the automobile. By the provision of the Bowden wire the manipulating handle may be placed, for that matter, at any convenient or desirable position.

Of course, it will be understood that the key shift mechanism and/or the Bowden wire control mechanism for the lock up clutch may be used in connection with three-speed transmissions, if desired, as well as with four-speed transmissions as illustrated.

In the structure illustrated in Figs. 11, 12, and 13, the propeller shaft 32 is piloted in a recess 75 in the rear end of the driven shaft 4 which is extended into the casing 30 of the free wheeling mechanism. On the driven shaft 4 is mounted the inner member 76 of an overrunning clutch, of the type heretofore described, which inner member is splined on the shaft for axial movement thereon. The inner member is surrounded by an outer member 77 of the overrunning clutch, which it will be noted is open from end to end and is provided at its rear end with internal teeth 78. This outer member 77 is locked to axially move with the inner member 76 by suitable locking rings 79 and 80 so that the two members move as a complete unit. The internal teeth 78 of the outer member 77 are adapted to engage external teeth 81 mounted on a clutch member 82 secured on the propeller shaft 32. While we have shown this member 82 as being secured on the shaft it may, if desired, be formed as an integral part of the shaft. By the engagement of the teeth 78 with the teeth 81 the propeller shaft 32 is driven from the driven shaft 4 through the overruning clutch. In order to lock up the overrunning clutch so that the propeller shaft 32 will be driven in either direction the inner member 76 of the overrunning clutch is provided with an extension having external teeth 83, which when the overruning clutch unit as a whole is moved to the right, in Fig. 11, meshes with internal teeth 84 on the member 82 so that the driven shaft 4 and the propeller shaft 32 are locked together for drive in either direction and the overrunning clutch is rendered ineffective.

For the purpose of shifting the overrunning clutch into and out of locked up position we provide a shift rail 85 which is mounted in the casing 30, and is provided with a shift fork 86 engaging an annular groove 87 in the outer member 77 of the overruning clutch. This shift rail 85 may be manipulated in any of the ways heretofore described, as by a shift lever or by means of a Bowden wire or equivalent linkage means. The forward end of the shift rail 85 is provided with a pin 88 which engages in a notch 89 on a lever 90 pivoted at 90' to the side of the casing 30. The upper end of this lever is connected either to the shift lever or Bowden wire or other mechanism used for manipulating the overrunning clutch member to move it into and out of clutching position.

In order that the overrunning clutch may always be moved into locked up position when the transmission mechanism is shifted to reverse drive we provide a shifting pin 91 which is slidably mounted in the rear end of the transmission casing, extending therethrough, and having a head 92 adapted to contact with the member 77 of the overrunning clutch. The forward end of this pin lies in the path of the gear 13 in such a position that when the gear is shifted rearwardly to mesh with the reverse gear idler it will strike this pin moving the same rearwardly and moving the overrunning clutch into locked up position.

It will be noted that in this structure any tendency on the part of the propeller shaft to whip is prevented by piloting the front end of the propeller shaft in the recess 75 of the driven shaft 4 and providing at this point a bearing 93 for the rear end of the driven shaft 4. Due to the fact that the propeller shaft is thus supported at its front end by the roller bearing 93' which, it will be seen, is in vertical alignment with the rear bearing 93 of the driven shaft 4 and is also supported in the bearing 95, the overrunning clutch mechanism and its locked up parts are supported between the two bearings which effectually stiffen these parts and prevent any danger of whipping either of the rear end of the driven shaft 4 or the front end of the propeller shaft.

We claim the following:

1. The combination with a transmission including a splined shaft and a gear axially shiftable thereon and a one and a two-way clutch including an axially shiftable two-way clutch member, of an axially movable shiftable member arranged in a splined recess in said shaft for engagement by said axially movable gear to shift said two-way clutch member into engaging position through the shifting movement of said gear.

2. The combination with a transmission including a splined shaft and a pair of gears on said shaft, one of which is arranged in front of the other and axially shiftable on said shaft, and a one and two-way clutch including an axially shiftable two-way clutch member, of an axially shiftable member arranged in a splined recess in said shaft and extending beneath said rearmost gear for engagement by said axially shiftable gear and moving said two-way clutch member into engaging position through the shifting of said shiftable gear.

3. The combination with a transmission including a splined shaft, a gear axially shiftable on said shaft, a bearing for one end of said shaft, said shaft projecting beyond said bearing, and a one and two-way clutch including an axially shiftable two-way clutch member, of a shiftable member arranged in a splined recess of said shaft and extending therein beneath said bearing, said member being engageable by said shiftable gear to move said two-way clutch member into engaging position.

JOHN M. SIMPSON.
SAMUEL O. WHITE.